(12) United States Patent
Amemiya

(10) Patent No.: US 11,565,488 B2
(45) Date of Patent: Jan. 31, 2023

(54) METHOD FOR MANUFACTURING LIGHT ABSORBER

(71) Applicant: National Institute of Advanced Industrial Science and Technology, Tokyo (JP)

(72) Inventor: Kuniaki Amemiya, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 272 days.

(21) Appl. No.: 16/760,712

(22) PCT Filed: May 9, 2018

(86) PCT No.: PCT/JP2018/017949
§ 371 (c)(1),
(2) Date: Apr. 30, 2020

(87) PCT Pub. No.: WO2019/087439
PCT Pub. Date: May 9, 2019

(65) Prior Publication Data
US 2020/0346421 A1    Nov. 5, 2020

(30) Foreign Application Priority Data

Nov. 2, 2017  (JP) .............................. JP2017-212380

(51) Int. Cl.
*B29D 11/00* (2006.01)
*B29C 33/38* (2006.01)
(Continued)

(52) U.S. Cl.
CPC ...... *B29D 11/0074* (2013.01); *B29C 33/3842* (2013.01); *B29C 41/02* (2013.01);
(Continued)

(58) Field of Classification Search
CPC . B29D 11/0074; B29C 33/3842; B29C 41/02; G02B 1/111; G02B 5/003; G02B 1/118; G02B 5/22; B29K 2083/00
See application file for complete search history.

(56) References Cited

U.S. PATENT DOCUMENTS

2007/0291386 A1* 12/2007 Yoshikawa ............ G02B 1/118
                                                         359/885
2009/0323189 A1* 12/2009 Taniguchi .............. G02B 1/118
                                                         427/523

FOREIGN PATENT DOCUMENTS

EP         2065736 A1    6/2009
JP      2008-233850 A   10/2008
(Continued)

OTHER PUBLICATIONS

Amemiya et al., "Fabrication of hard-coated optical absorbers with microstructured surfaces using etched ion tracks: Toward broadband ultra-low reflectance," Nuclear Instruments and Methods in Physics Research Section B, vols. 356-357, Aug. 1, 2015, pp. 154-159. (Year: 2015).*

(Continued)

*Primary Examiner* — Leith S Shafi
*Assistant Examiner* — Inja Song
(74) *Attorney, Agent, or Firm* — Locke Lord LLP

(57) ABSTRACT

This method for manufacturing a light absorber includes: a first step for irradiating a resin substrate with ion beams; a second step for etching the irradiated resin substrate with an alkaline solution to form an uneven surface on the surface thereof; a third step for forming a transfer body which covers the uneven surface of the etched resin substrate; and a fourth step for peeling off the transfer body from the resin substrate to obtain a light absorber. A metal film, a photocurable resin, and a silicone rubber are disclosed as an example of the transfer body.

20 Claims, 19 Drawing Sheets

(51) Int. Cl.
    *B29C 41/02*       (2006.01)
    *G02B 1/111*      (2015.01)
    *G02B 5/00*       (2006.01)
    *B29K 83/00*     (2006.01)

(52) U.S. Cl.
    CPC .............. *G02B 1/111* (2013.01); *G02B 5/003* (2013.01); *B29K 2083/00* (2013.01)

(56) References Cited

FOREIGN PATENT DOCUMENTS

| | | |
|---|---|---|
| JP | 5177581 B2 | 4/2013 |
| JP | 2017-032806 A | 2/2017 |
| JP | 2017032806 A * | 2/2017 |

OTHER PUBLICATIONS

English translation of JP-2017032806-A by EPO. (Year: 2017).*
Yuhei Shimizu, Hiroshi Koshikawa, Masatoshi Imbe, Tetsuya Yamaki, and Kuniaki Amemiya, "Large-area perfect blackbody sheets having aperiodic array of surface micro-cavities for high-precision thermal imager calibration," Opt. Express 28, 22606-22616 (2020) (Year: 2020).*
Amemiya, Kuniaki et al., "Fabrication of hard-coated optical absorbers with microstructured surfaces using etched ion tracks: toward broadband ultra-low reflectance," Nuclear Instruments and Methods in Physics Research B, 2015, vol. 356-357, pp. 154-159. (cited in the ISR and discussed in the spec).
International Search Report dated Jul. 31, 2018, issued for PCT/JP2018/017949.

\* cited by examiner

FIG. 15
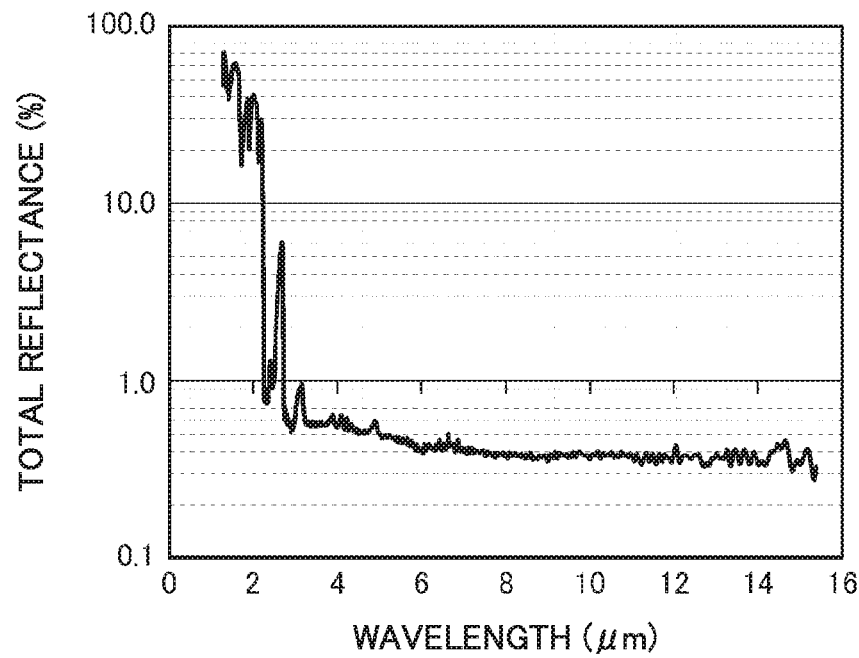
(a)
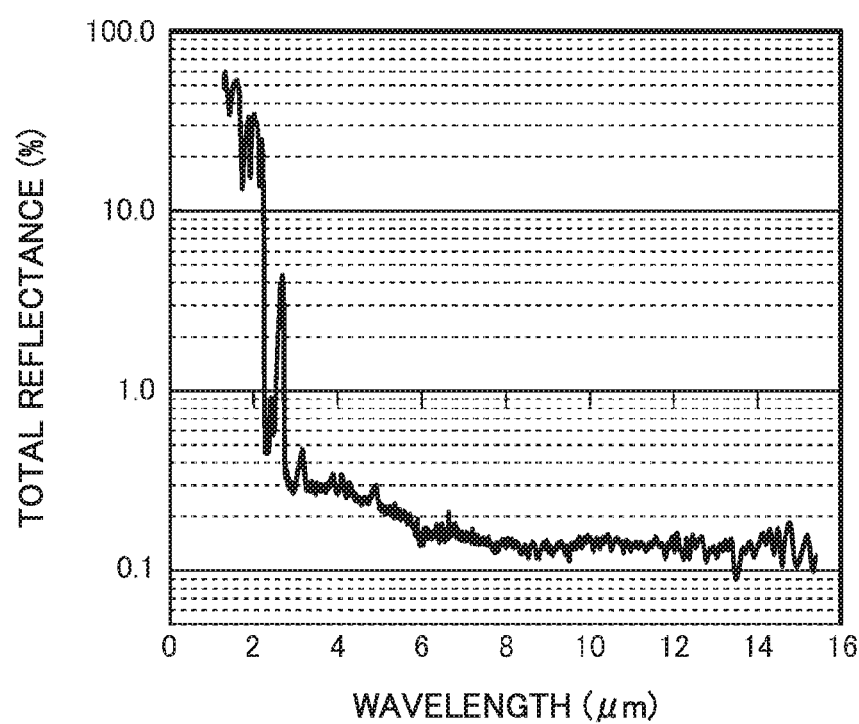
(b)

METHOD FOR MANUFACTURING LIGHT ABSORBER

TECHNICAL FIELD

The present invention relates to a method for manufacturing a light absorber, and more particularly to a method for manufacturing a light absorber having a low reflectance over a wide range of wavelengths.

BACKGROUND ART

Infrared cameras are used in various industrial fields. Examples include temperature monitoring of processes in factories, detection of temperature abnormalities, heat testing of integrated circuit board, body temperature management of cattle and pigs in the livestock industry, and detection of human body temperature in security systems, anti-flu measures, and the like.

In general cameras for visible light, black coating is applied to the lenses and housings in order to reduce stray light and diffuse reflection of visible light, but it is not easy to reduce stray light and diffuse reflection of infrared light in infrared cameras.

VANTABLACK (registered trademark) from Surrey NanoSystems, UK, is a low-reflection material with aligned carbon nanotubes and is known to have a very low reflectance at ultraviolet to far-infrared wavelengths. In addition, an antireflective structure is known in which an ion beam is irradiated onto a glassy carbon base material to form needle-like shapes on its surface (for example, see Patent Document 1).

The present inventors have developed a light absorber of which the total reflectance of light at visible to near-infrared wavelengths of 400 nm to 1700 nm is 1% to 3%. The light absorber was prepared by irradiating a CR-39 substrate with an ion beam from a cyclotron, etching the substrate and forming a nickel (Ni)/chromium (Cr) film and a diamond-like carbon layer on its surface (see Non-Patent Document 1).

Patent Document 1: Japanese Patent No. 5177581

Non-Patent Document 1: Kuniaki Amemiya and 8 others "Fabrication of hard-coated optical absorbers with microstructured surfaces using etched ion tracks: toward broadband ultra-low reflectance" Nuclear Instruments and Methods in Physics Research B, vol. 356-357, 2015, p. 154-159

DISCLOSURE OF THE INVENTION

Problems to be Solved by the Invention

It is an object of the present invention to provide a method for manufacturing a light absorber having a low reflectance.

Means for Solving the Problems

According to one aspect of the present invention, there is provided a method for manufacturing a light absorber, the method including: a first step of irradiating a resin substrate with an ion beam; a second step of etching the irradiated resin substrate with an alkaline solution to form an uneven surface on its surface; a third step of forming a transfer body which covers the uneven surface of the etched resin substrate; and a fourth step of peeling off the transfer body from the resin substrate to obtain a light absorber.

According to the above aspect, the uneven shape formed on the resin substrate by ion beam irradiation and etching is transferred to the transfer body, and the transfer body can be manufactured as a light absorber, whereby a light absorber having a low reflectance by the transferred uneven shape can be manufactured.

According to another aspect of the present invention, there is provided a method for manufacturing a light absorber, the method including: a first step of irradiating a resin substrate with an ion beam; and a second step of etching a surface of the irradiated resin substrate with an alkaline solution, wherein an uneven surface with a total reflectance of 0.1% or less at wavelengths of 4 μm to 15 μm is formed on the resin substrate by the first and second steps.

BRIEF DESCRIPTION OF THE DRAWINGS

FIG. 15 is a graph for explaining the difference in the measurement data depending on the setting of the measurement of the total reflectance;

PREFERRED MODE FOR CARRYING OUT THE INVENTION

Figure 1:
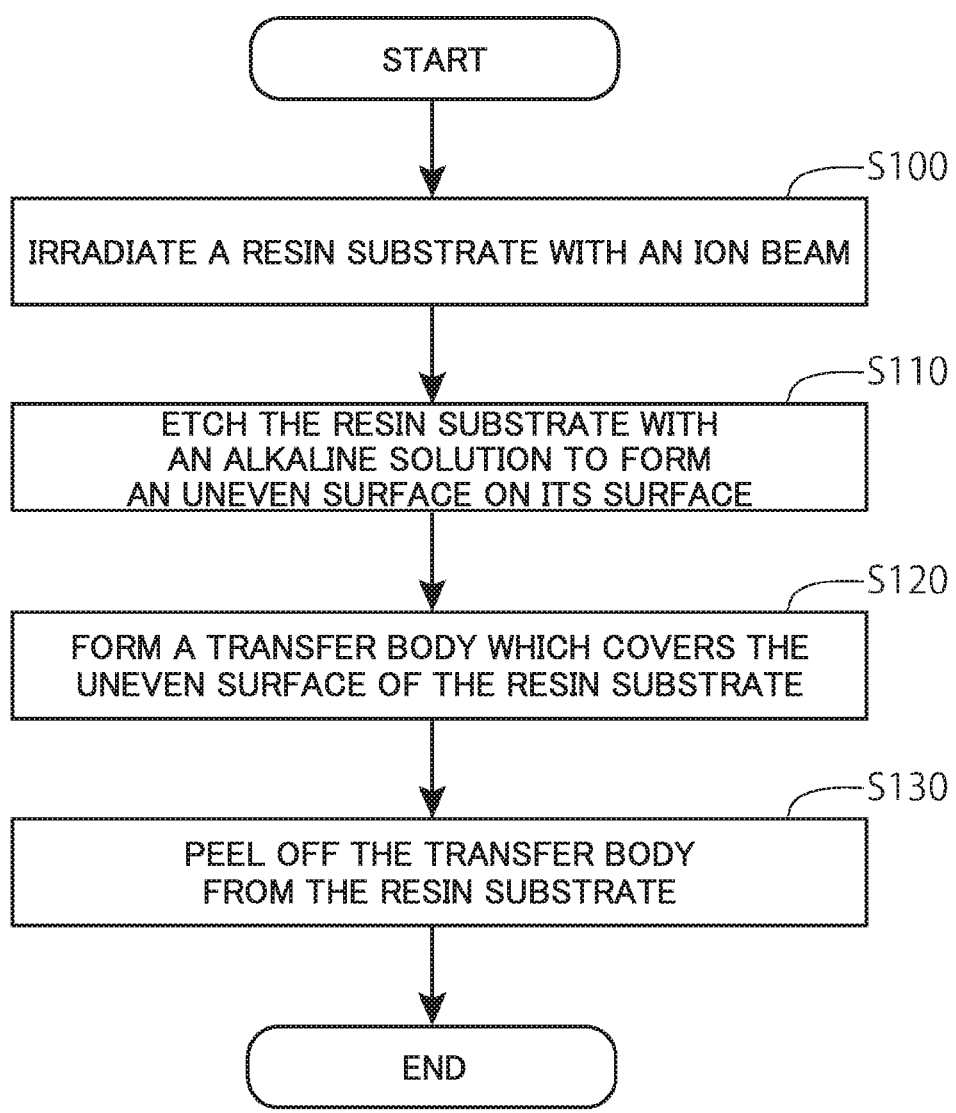
FIG. 1 is a flowchart showing a method for manufacturing a light absorber according to an embodiment of the present invention.

Hereinafter, an embodiment of the present invention will be described based on the drawings. It should be noted that a common element among a plurality of drawings is denoted by the same reference numeral, and detailed description of the element is not repeated.

FIG. 1 is a flowchart showing a method for manufacturing a light absorber according to an embodiment of the present invention. Referring to FIG. 1, the method for manufacturing a light absorber will be described.

Firstly, an ion beam is irradiated to a resin substrate (S100). Specifically, an ion beam accelerated by a cyclotron is irradiated to a resin substrate, for example, an allyl diglycol carbonate resin (CR-39). As a result, a large number of ion tracks are formed in the vicinity of the surface of the resin substrate. It is preferable that the ion tracks are randomly distributed. Although the ion beam may include oxygen ions, it is preferable that the ion beam include either neon (Ne) ions or ions heavier than neon (Ne) ions because etching can easily proceed selectively along the ion tracks in the resin substrate and the final pit aspect ratio (fraction of pit depth to pit radius) can be increased.

It is preferable that the acceleration energy of the ion beam is 200 MeV or more because a satisfactory penetration depth can be obtained and a large pit aspect ratio can be obtained even if the pit radius is large. Although the irradiation density of the ion beam to the resin substrate is selected as appropriate, it is preferable to be $1\times10^5/cm^2$ to $1\times10^6/cm^2$ from the viewpoint of the density of pits sufficient to capture light at far-infrared wavelengths.

Then, the resin substrate irradiated with the ion beam is etched with an alkaline solution to form an uneven surface on its surface (S110). Specifically, as the alkaline solution, an aqueous solution of sodium hydroxide or potassium hydroxide is used to immerse the resin substrate irradiated with the ion beam for a predetermined period of time while being heated to, for example, 70° C. The resin substrate is then rinsed with water and dried.

Next, a transfer body covering the uneven surface of the etched resin substrate is formed (S120). The transfer body is made from, for example, a metal film, a photocurable resin, or a silicone rubber. On the transfer body, an uneven surface having a shape in which the unevenness formed in S110 is inverted, is formed.

The transfer body is then peeled off from the resin substrate to obtain a light absorber (S130). As a result, the uneven shape formed on the resin substrate is transferred, and the transfer body with the uneven shape inverted is obtained.

If a metal film is formed as the transfer body in the transfer body forming step (S120) described above, a metal film (single metal or alloy film) of, for example, copper (Cu), nickel (Ni), cobalt (Co), or the like having a thickness of 100 nm to 500 nm is formed on the uneven surface of the resin substrate as an electrode layer for performing electroplating by, for example, a vacuum evaporation method or a sputtering method. As a base layer of the electrode layer, a titanium (Ti) film may be formed in order to improve adhesion. The electrode layer may be formed by an electroless plating method, and the uneven surface of the resin substrate may be surface-treated with a silane coupling agent in order to improve the adhesion between the electrode layer and the resin substrate. Next, using the electrode layer, an electroplating film of a single metal such as Ni, chromium (Cr), Cu, gold (Au), silver (Ag), and tin (Sn), or an alloy thereof, or an electroplating film in which these metals are stacked, is formed to be a thickness of, for example, 100 μm to 1 mm by an electroplating method. In the peeling step (S130) described above, a light absorber of a transfer body of a metal film having a surface on which the uneven shape of the resin substrate is inverted, is formed by peeling off the transfer body from the resin substrate. Since the light absorber is formed of a metal film, the uneven surface has high durability and heat resistance and is free of binder. It should be noted that the electrode layer may be formed by an electroless plating method, a vacuum evaporation method, or the like, and may be formed by a combination thereof. Alternatively, the entire metal film may be formed by an electroless plating method.

If a photocurable resin, for example, an ultraviolet curing resin is formed as the transfer body in the transfer body forming step (S120) described above, the ultraviolet curing resin is dropped and applied onto the uneven surface of the etched resin substrate and cured by ultraviolet irradiation. It is preferable to degas the ultraviolet curing resin before or after dropping. In the peeling step (S130) described above, a light absorber of the transfer body of the ultraviolet curing resin having a surface on which the uneven shape of the resin substrate is inverted, is formed by peeling off the transfer body from the resin substrate. As a result, the resin substrate having an uneven surface as a mold can be repeatedly used, so that the mass productivity is excellent and the cost is low.

In the transfer body forming step (S120) described above, if a silicone rubber is formed as the transfer body, a silicone composition, for example, a two-component curable silicone composition in which the main agent and the curing agent are mixed, is dropped and applied onto the uneven surface of the etched resin substrate to be cured. It is preferable to degas the silicone composition before or after dropping (before curing). In the peeling step (S130) described above, a light absorber of the transfer body of the silicone rubber having a surface on which the uneven shape of the resin substrate is inverted, is formed by peeling off the transfer body from the resin substrate. As a result, the resin substrate having an uneven surface as a mold can be repeatedly used, so that the mass productivity is excellent, the cost is low, and the heat resistance is excellent. Further, since the light absorber is flexible, it can be attached to a curved surface.

According to the method for manufacturing a light absorber of the present embodiment, an uneven shape formed on the resin substrate by ion beam irradiation and etching is transferred to a transfer body, and as the material of the transfer body, for example, a metal film, a photocurable resin, or a silicone rubber is selected, so that the light absorber is characterized by durability according to the material, mass productivity, and low cost. Further, as will be described later in the Examples, a light absorber with a low reflectance can be manufactured.

As a modification of the present embodiment, a re-transfer body covering the uneven surface of the transfer body may be formed after the peeling step (S130). For example, an uneven shape may be re-transferred by forming a re-transfer body from the above-mentioned photocurable resin or silicone composition on the uneven surface of the above-mentioned transfer body of a metal film, photocurable resin, or silicone rubber. In particular, since the metal film is excellent in durability, it can be used many times, so that the mass productivity is excellent. As a method for forming the re-transfer body, the above-described transfer process of a photocurable resin or a silicone composition can be used. Further, carbon powder, for example, carbon black or carbon nanotubes may be mixed with the photocurable resin or the silicone composition of the re-transfer body. As a result, the reflectance at ultraviolet to near-infrared wavelengths can be reduced, and the above-mentioned material of the re-transfer body can be made to precisely replicate the uneven surface of the transfer body by mixing the material of the re-transfer body with carbon nanotubes.

As another modification of the present embodiment, a light absorber having the uneven surface formed in S110 can be manufactured as a light absorber having a remarkable low reflectance at mid-infrared wavelengths, as shown in the Examples described later.

[Example 1]

A CR-39 resin substrate with a thickness of 0.8 mm (product name: Baryotrak, manufactured by Fukuvi Chemical Industry Co., Ltd.; sold by Nagase Landauer, Ltd.) was irradiated with neon (Ne) ions with an acceleration energy of 260 MeV using an AVF cyclotron from the Takasaki Quantum Application Research Institute of National Institutes for Quantum and Radiological Science and Technology. The irradiation density was set to be $1 \times 10^6 / cm^2$.

Next, the resin substrate irradiated with the ion beam was immersed in an aqueous solution of sodium hydroxide of 6.38 N at 70° C. for 9 hours to be etched, and then rinsed with water and dried to obtain a resin substrate having fine unevenness formed on its surface.

Next, an electrode layer of a Ti film having a thickness of 50 nm and a Cu film having a thickness of 300 nm for electroplating was formed on the uneven surface of the resin substrate by a sputtering method. Then, an Ni plating film having a thickness of 500 μm was formed on the electrode layer as a transfer body by an electroplating method.

Subsequently, the Ni plating film was peeled off from the resin substrate to obtain a light absorber of the Ni plating film to which the unevenness was transferred.

Figure 2:
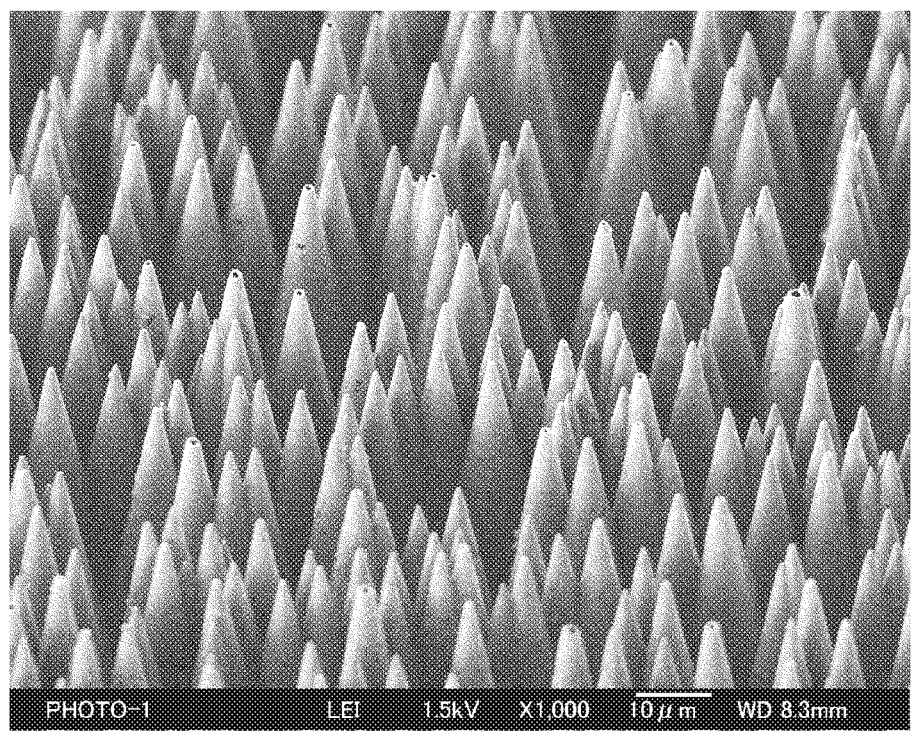
FIG. 2 is an electron micrograph of the surface of a light absorber of Example 1 of the present invention.

FIG. 2 is an electron micrograph of the surface of the light absorber of Example 1. Referring to FIG. 2, it can be seen that a large number of conical projections decreasing in diameter from the root to the tip are formed on the surface of the light absorber of the Ni plating film so that the tips of the projections are separated from each other by several μm to several tens of μm.

Incidentally, as for the electron microscopy, a scanning electron microscope (product name: JSM-7400F; acceleration voltage: 1.5 kV) manufactured by JEOL Ltd. was used, and the magnification was 1000 times.

Figure 3:
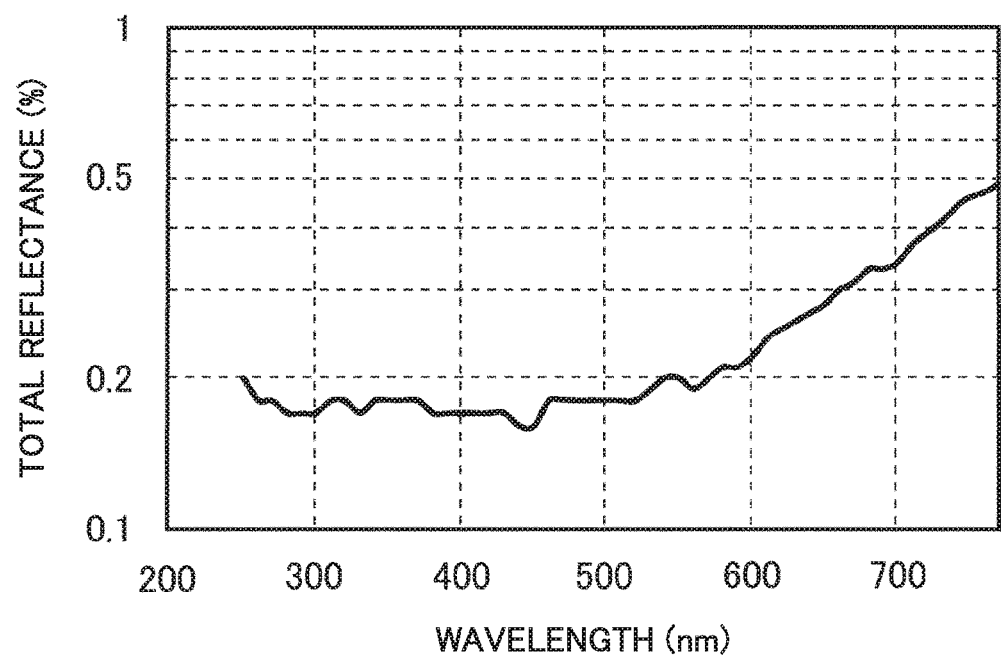
FIG. 3 is a graph showing the total reflectance of the light absorber of Example 1 of the present invention.

FIG. 3 is a graph showing the total reflectance of the light absorber of Example 1. Referring to FIG. 3, it can be seen that the total reflectance of the light absorber of the Ni plating film at wavelengths of 250 nm to 770 nm is reduced to 0.5% or less and is 0.1% or more.

The total reflectance was measured at intervals of 10 nm at wavelengths of 250 nm to 750 nm using a hemispherical total reflectance measuring unit (Spectralon integrating sphere) in an ultraviolet-visible near-infrared spectrophotometer (product name: LAMBDA 900) manufactured by PerkinElmer, Inc. As a reference standard, a Spectralon 99% reflectance standard with calibration values (manufactured by Labsphere, Inc., USA; product number: SRS-99-020) was used.

[Example 2]

In the same manner as in Example 1, an uneven surface was formed on a CR-39 resin substrate.

Next, an ultraviolet curing resin (manufactured by UNITEC Co., Ltd.; product name: Uni Solar Soft) that is mainly composed of urethane acrylate and epoxy acrylate resins was dropped and applied onto the uneven surface of the resin substrate to cover the surface. After degassing, the ultraviolet curing resin was cured by irradiation with ultraviolet light at a wavelength of 385 nm using a UV lamp for 3 to 6 minutes from the opposite side of the uneven surface of the CR-39 resin substrate.

Subsequently, the cured ultraviolet curing resin was peeled off from the resin substrate to obtain a light absorber of the ultraviolet curing resin to which the unevenness was transferred.

Figure 4:
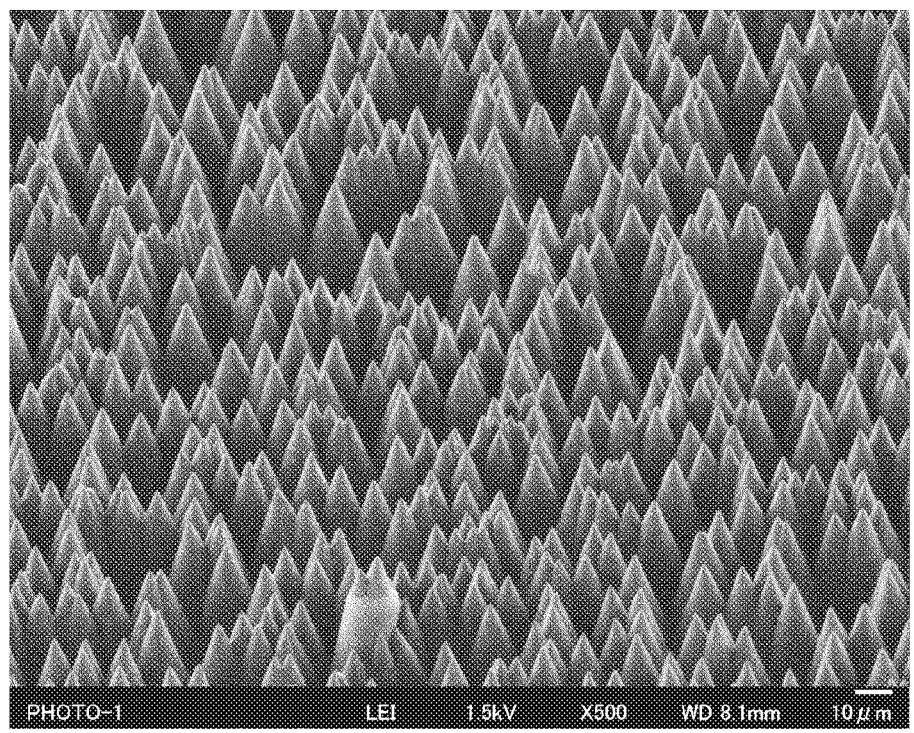
FIG. 4 is an electron micrograph of the surface of a light absorber of Example 2 of the present invention.

FIG. 4 is an electron micrograph of the surface of the light absorber of Example 2. Referring to FIG. 4, it can be seen that a large number of conical projections decreasing in diameter from the root to the tip are formed on the surface of the light absorber of the ultraviolet curing resin so that the tips of the projections are separated from each other by several μm to several tens of μm. The same electron microscope as in Example 1 was used, and the magnification was 500 times.

Figure 5:
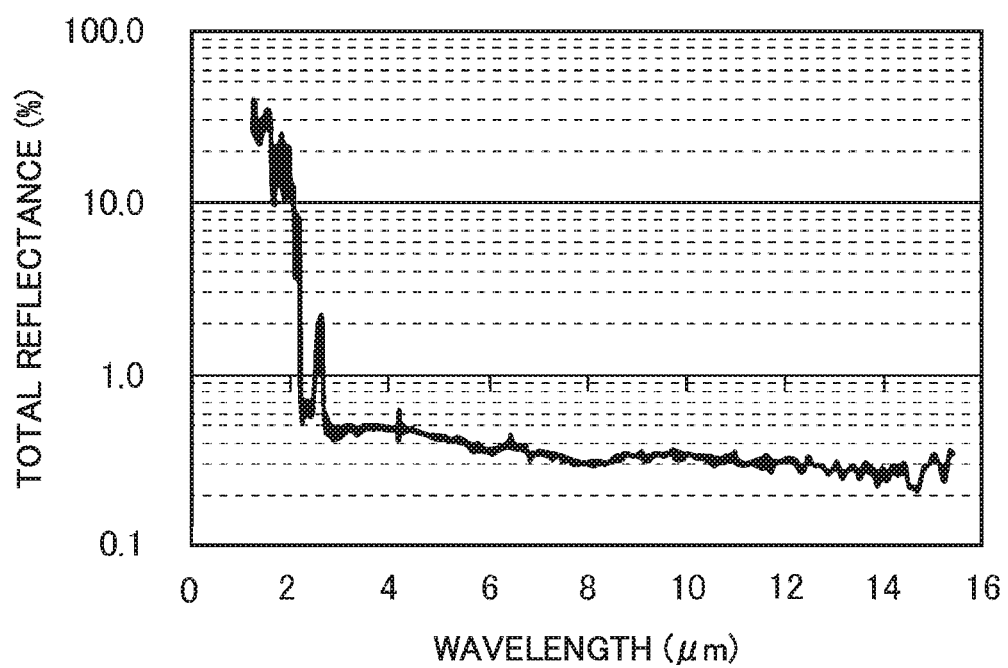
FIG. 5 is a graph showing the total reflectance of the light absorber of Example 2 of the present invention.

FIG. 5 is a graph showing the total reflectance of the light absorber of Example 2. Referring to FIG. 5, it can be seen that the total reflectance of the light absorber of the ultraviolet curing resin at wavelengths of 5 μm to 15 μm is reduced to 0.5% or less and is 0.2% or more.

The total reflectance was measured at wavenumber intervals of 0.96 $cm^{-1}$ at wavelengths of 1.28 μm to 15.4 μm (wavenumber of 650 $cm^{-1}$ to 7800 $cm^{-1}$) using a hemispherical total reflectance measuring unit (gold coated integrating sphere) in a Fourier-transform infrared (FTIR) spectrometer (product name: FT/IR-6300 type A) manufactured by JASCO Corporation. As a reference standard, a reflectance standard with calibration values (manufactured by Labsphere, Inc., USA; product name: Infragold) was used.

Figure 6:
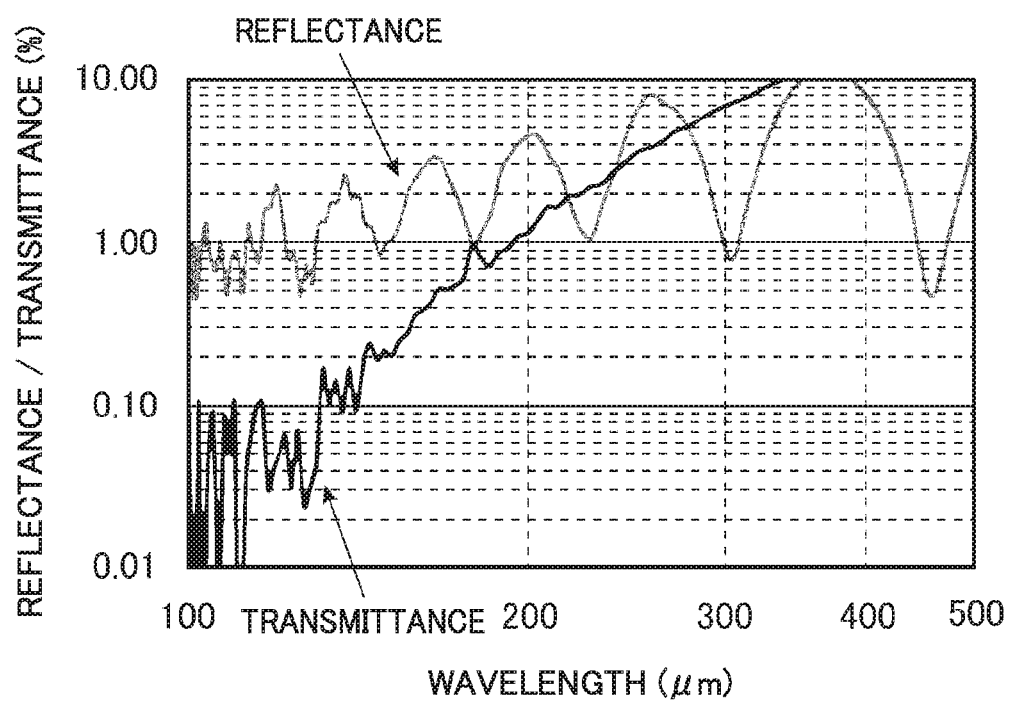
FIG. 6 is a graph showing the reflectance and transmittance of the light absorber of Example 2 at far-infrared wavelengths.

FIG. 6 is a graph showing the reflectance and transmittance of the light absorber of Example 2 at far-infrared wavelengths. Referring to FIG. 6, it can be seen that the light absorber of the ultraviolet curing resin has a reflectance of 1% or less at a far-infrared wavelength of 100 μm. Considering this and the fact that the total reflectance at mid-infrared wavelengths of 5 μm to 15 μm shown in FIG. 5 is reduced to 0.5% or less, it is presumed that the reflectance at wavelengths of 15 μm to 100 μm, which was not measured this time, is 1% or less. In addition, since the light absorber of the ultraviolet curing resin has a transmittance of 0.1% or less at a far-infrared wavelength of 100 μm, it is presumed that the light absorptance is 98.9% or more.

As for the measurement of the reflectance and transmittance at far-infrared wavelengths, the reflectance and transmittance of only specular components were measured using a terahertz spectrometer (product name: TR-1000) manufactured by Otsuka Electronics Co., Ltd.

[Example 3]

In the same manner as in Example 1, an uneven surface was formed on a CR-39 resin substrate.

Next, the main agent and the curing agent of a two-component curable silicone composition (manufactured by Shin-Etsu Silicone Co., Ltd.; SIM-360 main agent and CAT-360 curing agent) were mixed at a ratio of 9:1. After degassing, the mixture was dropped and applied onto the uneven surface of the resin substrate to cover the surface. After further degassing in a vacuum desiccator, it was allowed to stand at room temperature for 12 hours to obtain a cured silicone rubber.

Subsequently, the cured silicone rubber was peeled off from the resin substrate to obtain a light absorber of the silicone rubber to which the unevenness was transferred.

Figure 7:
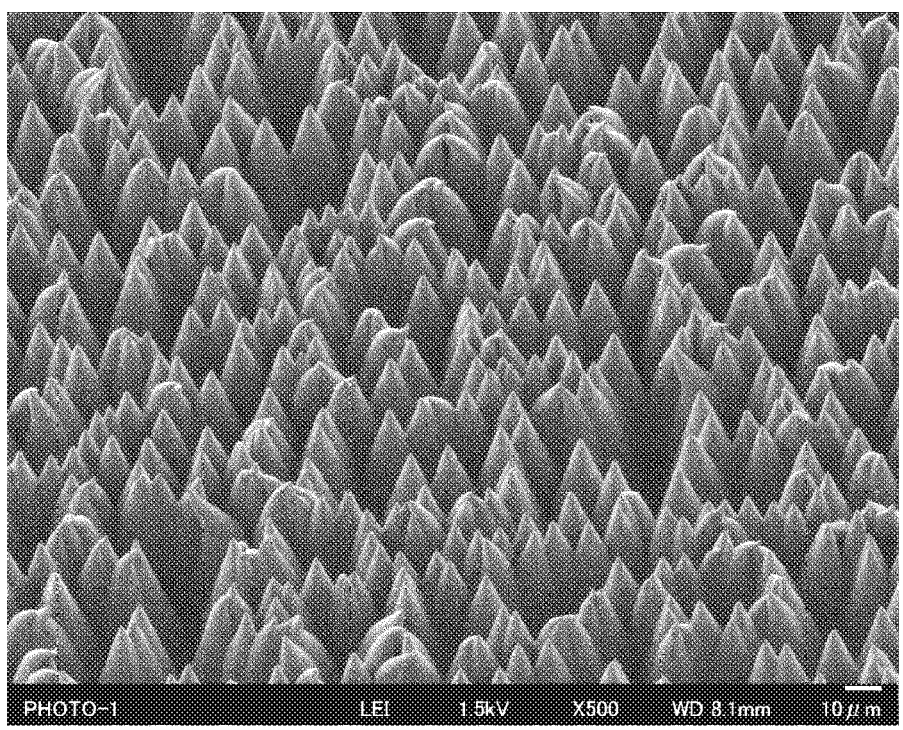
FIG. 7 is an electron micrograph of the surface of a light absorber of Example 3 of the present invention.

FIG. 7 is an electron micrograph of the surface of the light absorber of Example 3. Referring to FIG. 7, it can be seen that a large number of conical projections decreasing in diameter from the root to the tip are formed on the surface of the light absorber of the silicone rubber so that the tips of the projections are separated from each other by several μm to several tens of μm. The same electron microscope as in Example 1 was used, and the magnification was 500 times.

Figure 8:
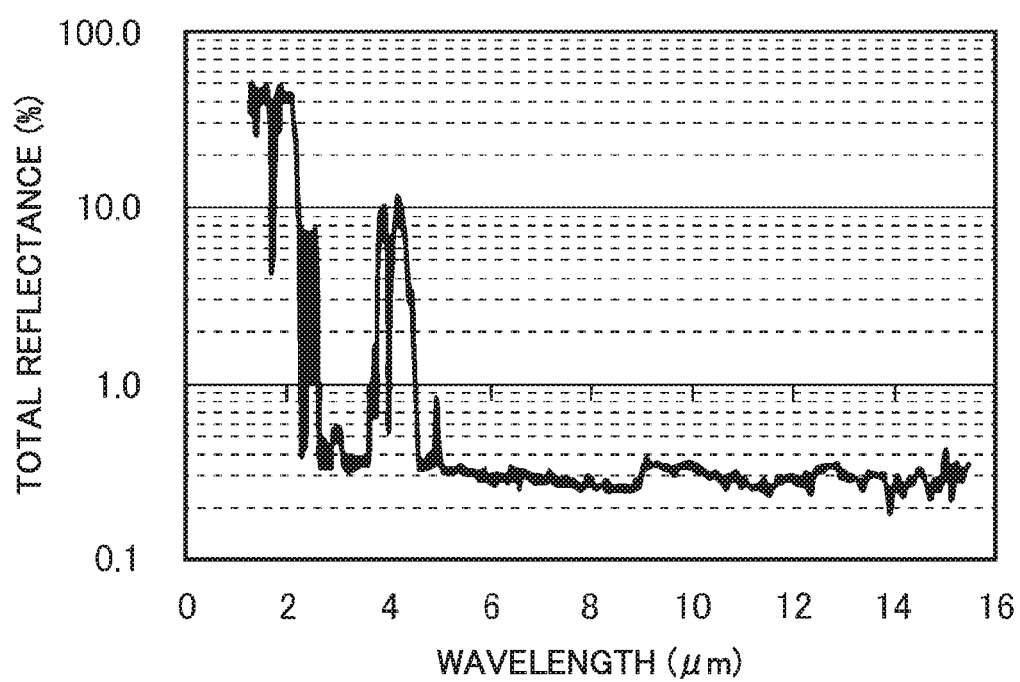
FIG. 8 is a graph showing the total reflectance of the light absorber of Example 3 of the present invention.

FIG. 8 is a graph showing the total reflectance of the light absorber of Example 3. Referring to FIG. 8, it can be seen that the total reflectance of the light absorber of the silicone rubber at mid-infrared wavelengths of 5 μm to 15 μm is reduced to 0.5% or less and is 0.1% or more. The measurement conditions of the total reflectance were the same as those of the measurement of FIG. 5 in Example 2.

[Example 4]

In Example 4, the light absorber of the Ni-plating film of Example 1 was used to prepare a transfer body of its uneven surface.

Next, the main agent and the curing agent of a two-component curable silicone composition (manufactured by Shin-Etsu Silicone Co., Ltd.; SIM-360 main agent and CAT-360 curing agent) were mixed at a ratio of 9:1, and further, 5 wt % carbon black was mixed and kneaded with the silicone composition. After degassing, the mixture was dropped and applied onto the uneven surface of the Ni plating film to cover the surface. After further degassing in a vacuum desiccator, it was allowed to stand at room temperature for 12 hours to obtain a cured silicone rubber.

Subsequently, the cured silicone rubber was peeled off from the Ni plating film to obtain a light absorber of the carbon black-containing silicone rubber to which the unevenness was transferred.

Figure 9:
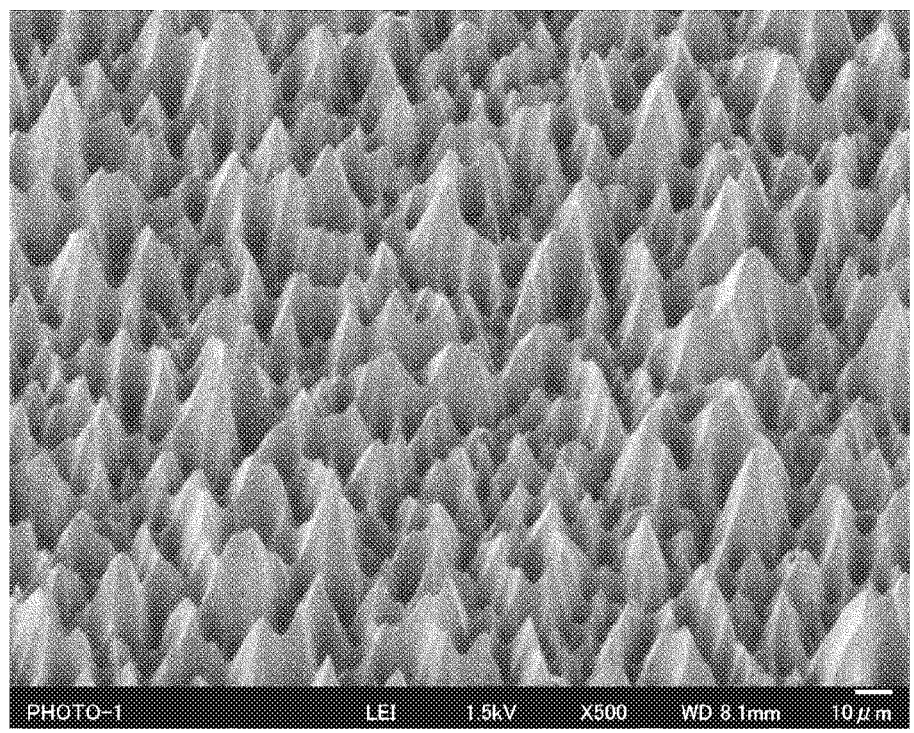
FIG. 9 is an electron micrograph of the surface of a light absorber of Example 4 of the present invention.

FIG. 9 is an electron micrograph of the surface of the light absorber of Example 4. Referring to FIG. 9, it can be seen that a large number of projections having a plurality of tips connected in a ridge shape are formed on the surface of the light absorber of the carbon black-containing silicone rubber, and that the tips of the projections are separated from each other by several μm to several tens of μm. The same electron microscope as in Example 1 was used, and the magnification was 500 times. Since this shape is similar to the shape of FIG. 11 in Example 5 to be described later, it can be presumed that this shape has at least the characteristics of low reflectance shown in FIG. 11. Further, since carbon black is contained, a low reflectance can be expected even at ultraviolet to near-infrared wavelengths.

[Example 5]

In Example 5, in the same manner as in Example 1, a CR-39 resin substrate was irradiated with neon (Ne) ion beam having an acceleration energy of 260 MeV at a density of $1\times10^6/cm^2$. Then, the resin substrate was immersed in an aqueous solution of sodium hydroxide of 6.38 N at 70° C. for 9 hours to be etched, and then rinsed with water and dried to obtain a resin substrate having fine unevenness formed on its surface.

Figure 10:
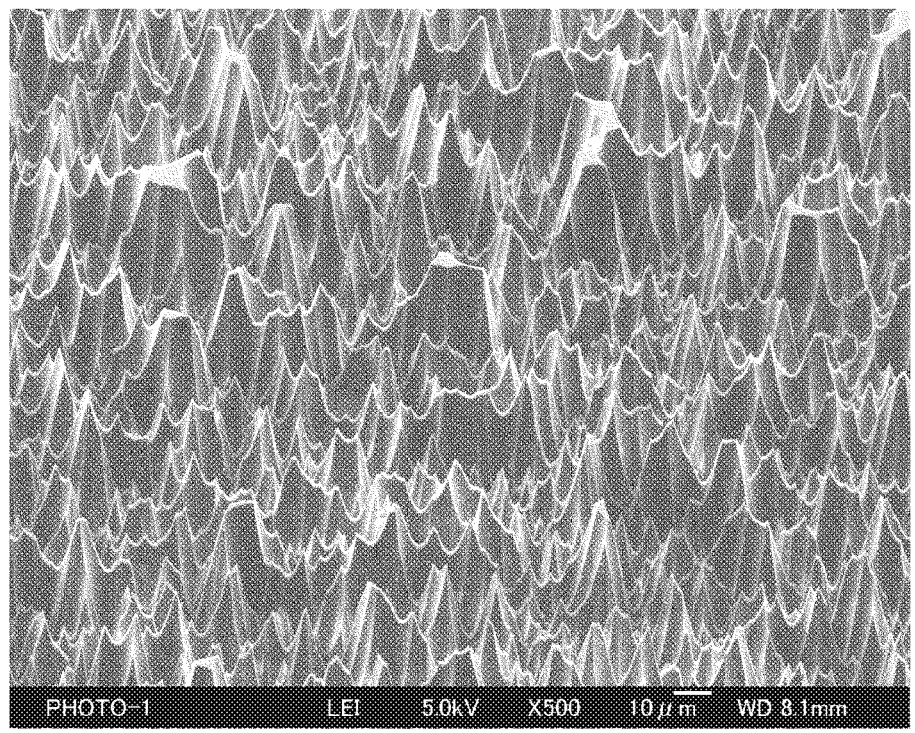
FIG. 10 is an electron micrograph of the surface of a light absorber of Example 5 of the present invention.

FIG. 10 is an electron micrograph of the surface of a light absorber of Example 5. Referring to FIG. 10, it can be seen that a large number of projections having a plurality of tips connected in a ridge shape are formed on the surface of the light absorber of the resin substrate, the tips of the projections are formed so as to be separated from each other by several μm to several tens of μm, and the projections connected in a ridge shape are formed so as to be separated from each other by several μm to several tens of μm. The same electron microscope as in Example 1 was used, and the magnification was 500 times.

Figure 11:
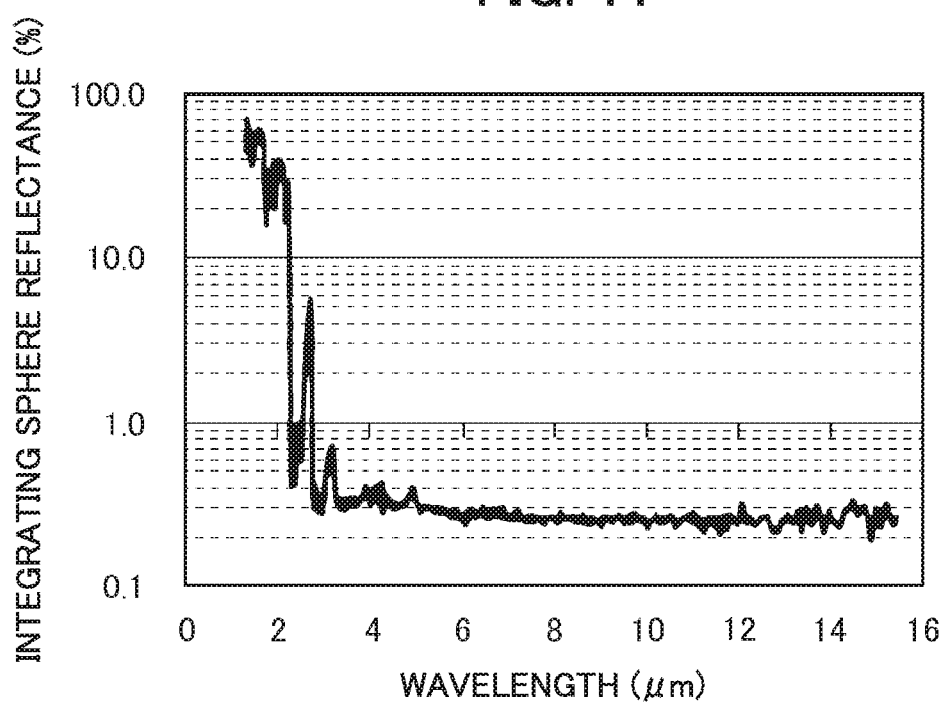
FIG. 11 is a graph showing the total reflectance of the light absorber of Example 5 of the present invention.

FIG. 11 is a graph showing the total reflectance of the light absorber of Example 5. Referring to FIG. 11, it can be seen that the total reflectance of the light absorber of the resin substrate of Example 5 at mid-infrared wavelengths of 5 μm to 15 μm is reduced to 0.4% or less and is 0.2% or more. The measurement conditions of the total reflectance were the same as those of the measurement of FIG. 5 in Example 2.

The above-mentioned FIG. 5 of Example 2, FIG. 8 of Example 3, and FIG. 11 of Example 5 show the measurement results of the total reflectance at mid-infrared wavelengths of 1.28 μm to 15.4 μm. In these measurements, the data of the total reflectance of each sample of the light absorber is obtained by two measurements, which are the measurement of the total reflectance of the sample (hereinafter referred to as "sample measurement") and the measurement of the background (hereinafter referred to as "background measurement").

Figure 12:
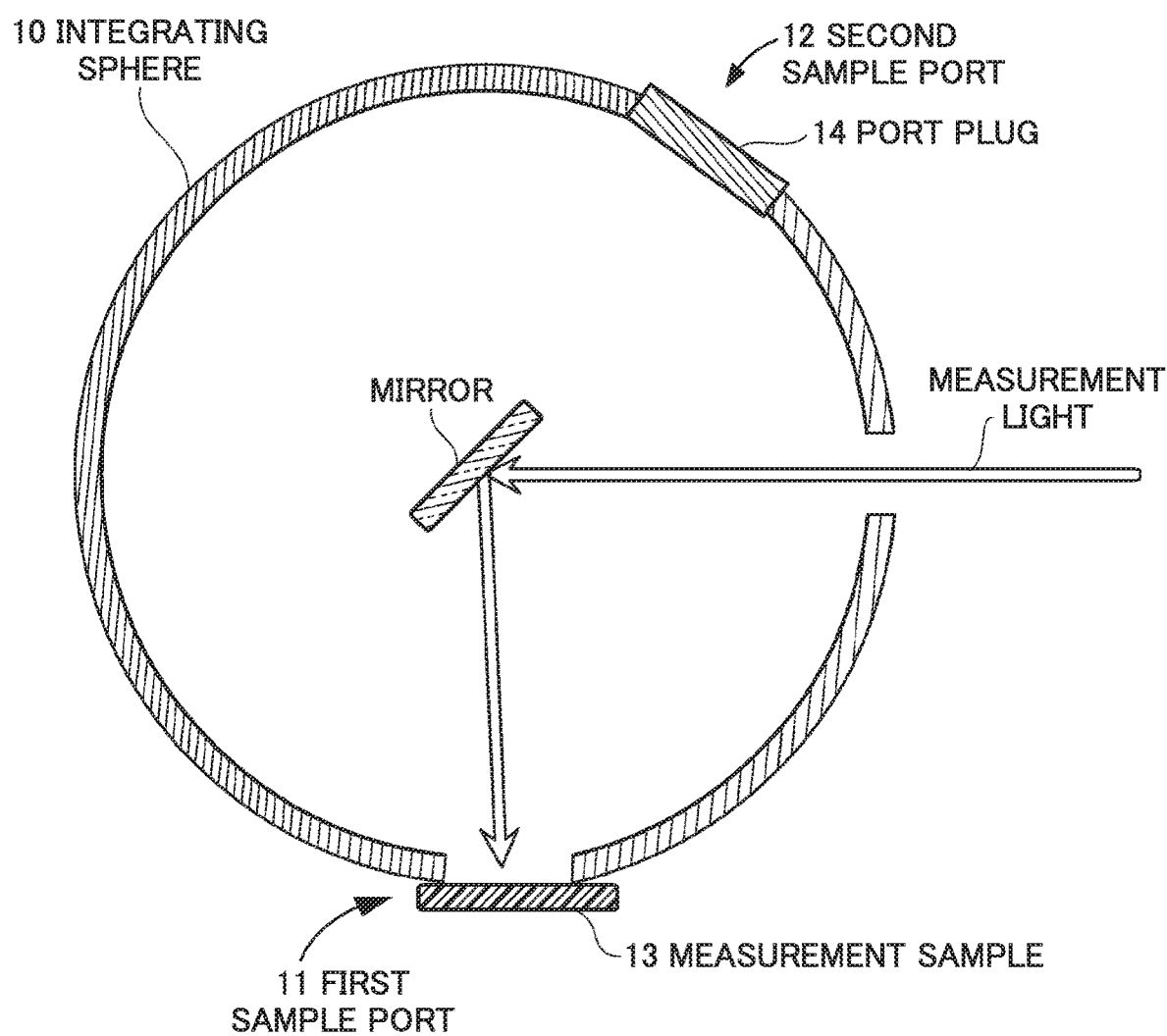
FIG. 12 is a diagram for explaining the setting in which the first sample port was used in the measurement of the total reflectance.
Figure 13:
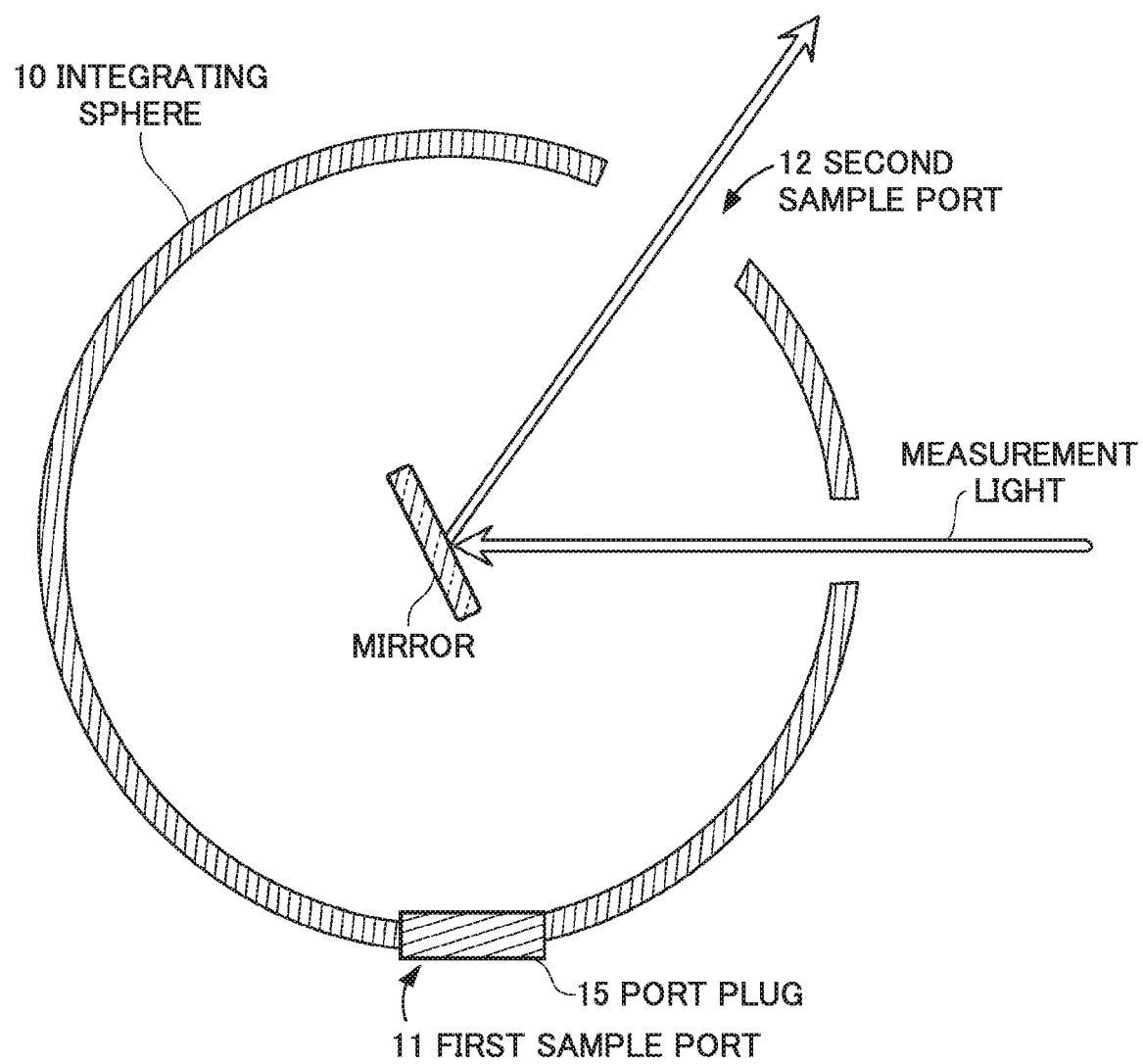
FIG. 13 is a diagram for explaining the setting for the measurement of the background in the measurement of the total reflectance.

FIG. 12 is a diagram for explaining the setting in which the first sample port was used in the measurement of the total reflectance. FIG. 13 is a diagram for explaining the setting of the measurement of the background in the measurement of the total reflectance. Referring to FIGS. 12 and 13, in the hemispherical total reflectance measuring unit (gold coated integrating sphere) used in the measurement, an integrating sphere 10 is provided with circular openings as sample ports for setting a measurement sample. The sample ports include a first sample port 11 having a diameter of the opening of 20 mm and a second sample port 12 having a diameter of the opening of 30 mm. In FIG. 5 of Example 2, FIG. 8 of Example 3, and FIG. 11 of Example 5 described above, the sample measurement was performed by setting a measurement sample 13 in the first sample port 11 so that measurement light was incident on the sample as shown in FIG. 12. The background measurement was performed so that measurement light passed through the second sample port 12 as shown in FIG. 13. In the sample measurement shown in FIG. 12, the second sample port 12 was closed by a port plug 14, and in the background measurement, the first sample port 11 was closed by a port plug 15. As described above, since measurement light was incident on different sample ports between the sample measurement and the background measurement, sample measurement corresponding to the background measurement was not performed. The inventors of the present application noticed that the total reflectance of the measurement sample was not properly obtained in FIG. 5 of Example 2, FIG. 8 of Example 3, and FIG. 11 of Example 5 described above, and carried out measurement again as follows.

Figure 14:
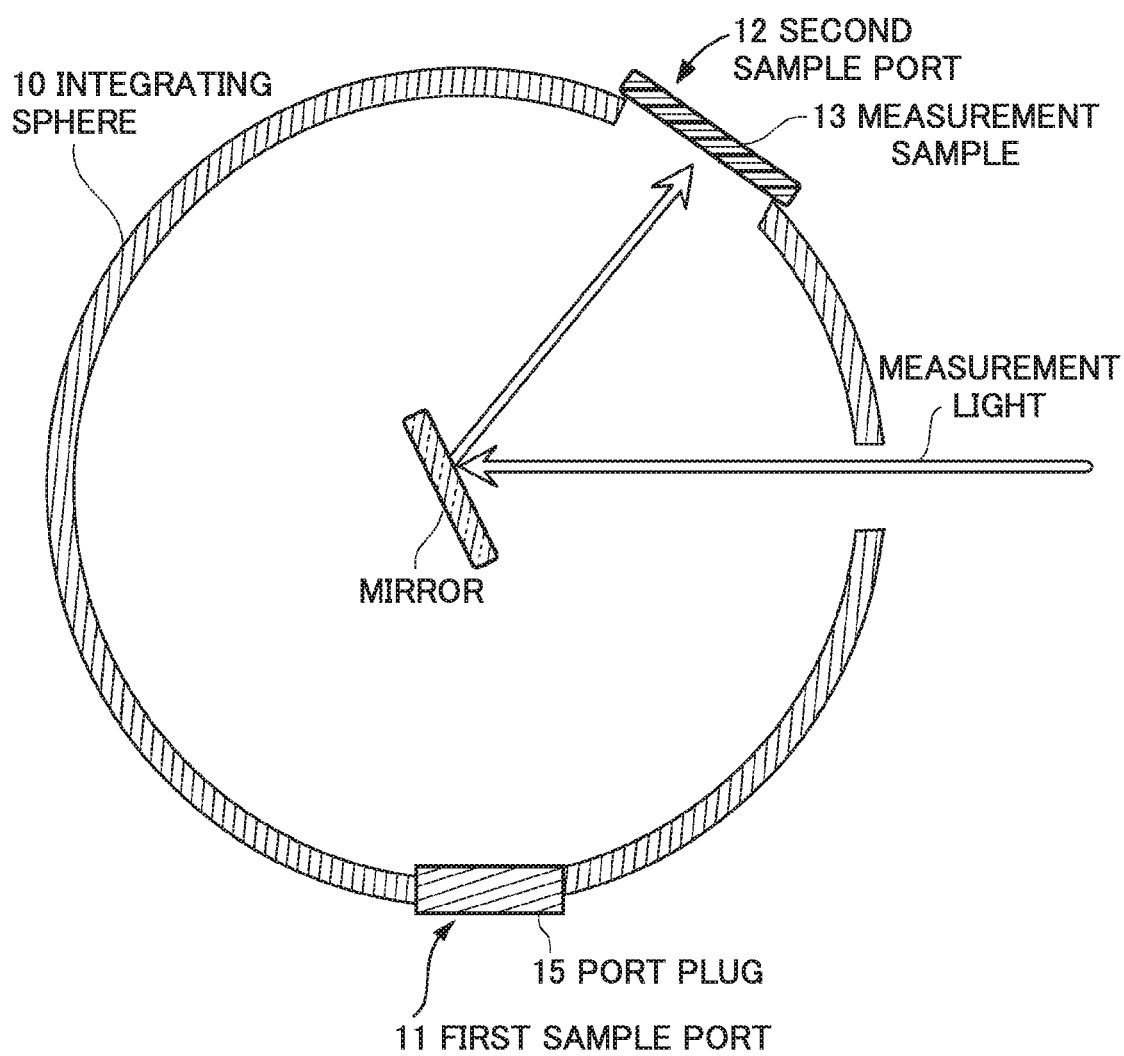
FIG. 14 is a diagram for explaining the setting in which the second sample port was used in the measurement of the total reflectance.

FIG. 14 is a diagram for explaining the setting in which the second sample port was used in the measurement of the total reflectance. As a new measurement, as shown in FIG. 14, measurement was performed by setting the measurement sample 13 in the second sample port 12. As shown in FIG. 13, the background measurement was performed so that measurement light passed through the second sample port 12 in which the measurement sample 13 was not set.

FIG. 15 is a graph for explaining the difference in the measurement data depending on the setting of the measurement of the total reflectance. FIG. 15(a) shows data obtained when sample measurement was performed in the arrangement shown in FIG. 12, and FIG. 15(b) shows data obtained when sample measurement was performed in the arrangement shown in FIG. 14. It should be noted that both data are data in which the light absorber of Example 5 described above was used as the measurement sample and the background is not eliminated, i.e., so-called raw data.

It is understood that the total reflectance shown in FIG. 15(*b*) when the measurement sample 13 was set in the second sample port 12 (FIG. 14) is lower than the total reflectance shown in FIG. 15(*a*) when the measurement sample 13 was set in the first sample port 11 (FIG. 12). For example, regarding the total reflectance at a wavelength of 4 μm, it is 0.6% in FIG. 15(*a*), while it is 0.3% in FIG. 15(*b*). As apparent from this fact, the total reflectance obtained when sample measurement was performed in the above-mentioned FIG. 5 of Example 2, FIG. 8 of Example 3, and FIG. 11 of Example 5, in which the measurement sample 13 was set in the first sample port 11, was higher than that in the case where the measurement sample 13 was set in the second sample port 12.

[Total Reflectance Obtained with Sample Measurement Using the Second Sample Port 12 and Background Measurement]

The following is the total reflectance obtained with sample measurement performed by setting a sample in the second sample port 12 and background measurement performed so as to pass measurement light through the second sample port 12 in which the measurement sample 13 was not set. The measurement sample is the same as the sample used in each example, and the measurement device is the same as the measurement device described in FIG. 5 (Example 2) above.

Figure 16:
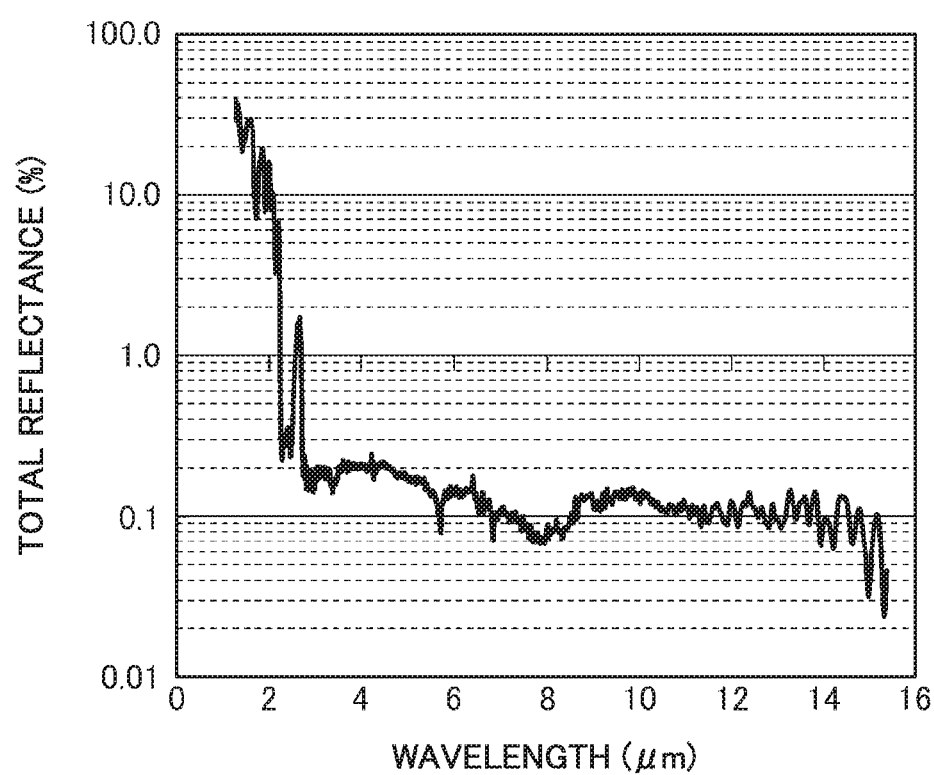
FIG. 16 is a graph showing the total reflectance (using the second sample port) of the light absorber of Example 2 of the present invention.

FIG. 16 is a graph showing the total reflectance (using the second sample port) of the light absorber of Example 2 of the present invention. Referring to FIG. 16, it can be seen that the light absorber of the ultraviolet curing resin of Example 2 has a total reflectance of 0.3% or less and 0.02% or more at mid-infrared wavelengths of 3 μm to 15 μm.

Figure 17:
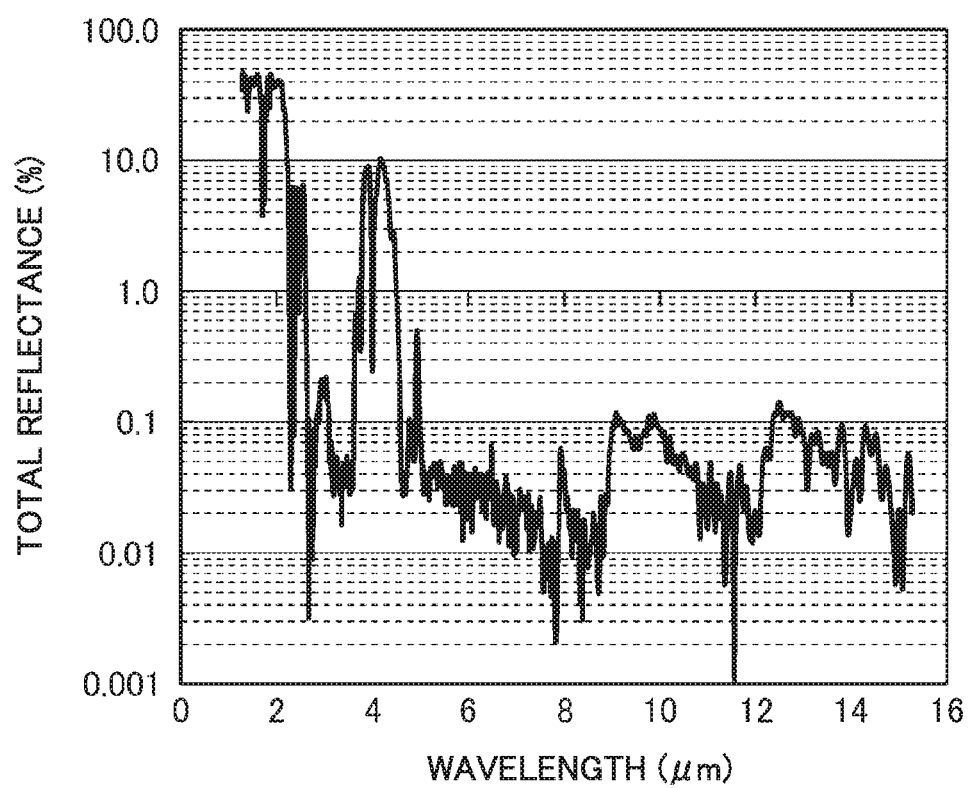
FIG. 17 is a graph showing the total reflectance (using the second sample port) of the light absorber of Example 3 of the present invention.

FIG. 17 is a graph showing the total reflectance (using the second sample port) of the light absorber of Example 3 of the present invention. Referring to FIG. 17, it can be seen that the light absorber of the silicone rubber of Example 3 has a total reflectance of 0.2% or less and 0.001% or more at mid-infrared wavelengths of 5.5 μm to 15 μm.

Figure 18:
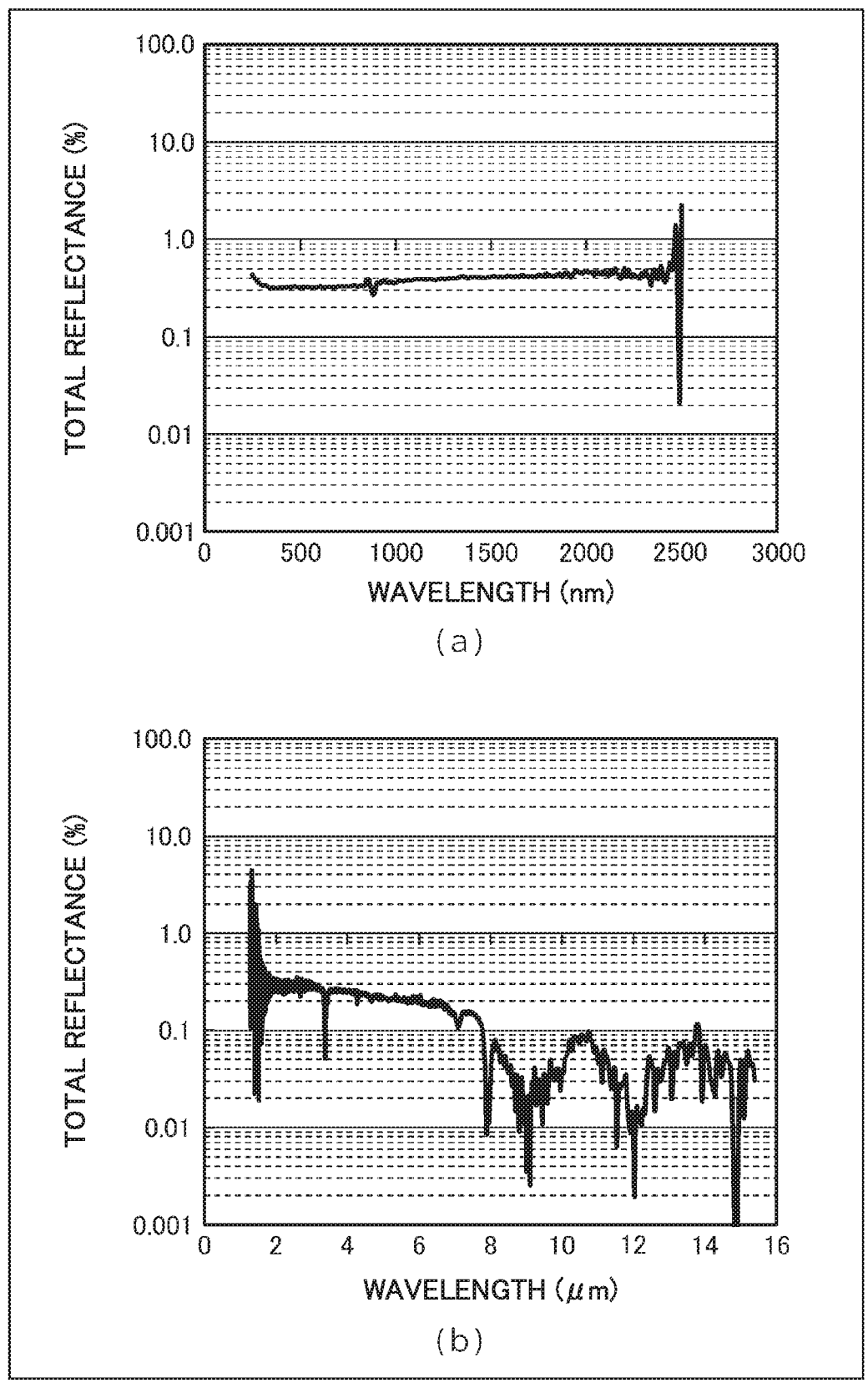
FIG. 18(*a*) is a graph showing the total reflectance at shorter wavelengths of the light absorber of Example 4 of the present invention, and FIG. 18(*b*) is a graph showing the total reflectance at longer wavelengths (using the second sample port) of the light absorber of Example 4 of the present invention.

FIG. 18(*a*) is a graph showing the total reflectance at shorter wavelengths of the light absorber of Example 4 of the present invention, and FIG. 18(*b*) is a graph showing the total reflectance at longer wavelengths (using the second sample port) of the light absorber of Example 4 of the present invention. As described above, the light absorber of Example 4 is a transfer body composed of a carbon black-containing silicone rubber and obtained by covering the uneven surface of the light absorber of the Ni-plating film of Example 1 with a carbon black-containing silicone composition and peeling off the composition after curing, and has the surface shown in the electron micrograph in FIG. 9. Referring to FIG. 18(*a*), it can be seen that the light absorber of the carbon black-containing silicone rubber of Example 4 has a total reflectance of 0.6% or less and 0.2% or more at ultraviolet to near-infrared wavelengths of 250 nm (0.25 μm) to 2400 nm (2.4 μm). Referring to FIG. 18(*b*), it can be seen that the light absorber of the carbon black-containing silicone rubber of Example 4 has a total reflectance of 0.4% or less and 0.001% or more at mid-infrared wavelengths of 2 μm to 15 μm. The total reflectance at ultraviolet to near-infrared wavelengths of 0.25 μm to 2.4 μm was measured at wavelength intervals of 10 nm using a hemispherical total reflectance measuring unit (Spectralon integrating sphere) in an ultraviolet-visible near-infrared spectrophotometer (product name: LAMBDA 900) manufactured by PerkinElmer, Inc. As a reference standard, a Spectralon 99% reflectance standard with calibration values (manufactured by Labsphere, Inc., USA; product number: SRS-99-020) was used.

Figure 19:
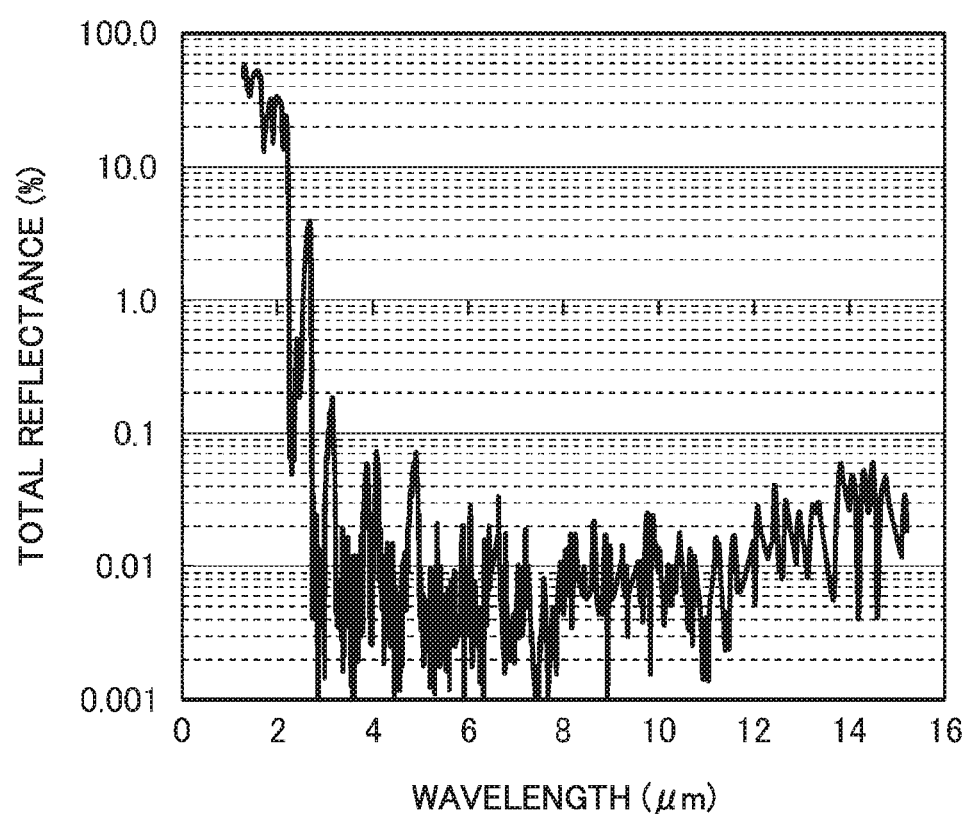
FIG. 19 is a graph showing the total reflectance (using the second sample port) of the light absorber of Example 5 of the present invention.

FIG. 19 is a graph showing the total reflectance (using the second sample port) of the light absorber of Example 5 of the present invention. Referring to FIG. 19, it can be seen that the light absorber of the resin substrate of Example 5 has a total reflectance of 0.1% or less and 0.001% or more at mid-infrared wavelengths of 4 μm to 15 μm.

While an embodiment and examples of the present invention have been described in detail, the present invention is not limited to the specific embodiment and examples, and various modifications and changes can be made within the scope of the present invention recited in the Claims.

In addition, a light absorber manufactured by a manufacturing method according to the embodiment of the present invention can be used for a wide range of applications such as thermography for plant monitoring and detection of persons who have fever, infrared sensors for vehicle-mounted pedestrian night vision devices, nighttime security, watching, etc., and infrared sensors for earth observation (remote sensing). Furthermore, since the area of the light absorber can be easily increased, it can be used as a planar blackbody standard having an emissivity of nearly 100% at main emission wavelengths at normal temperatures, for example, wavelengths of 3 μm to 100 μm.

The following appendices are disclosed as further embodiments with respect to the above description.

(Appendix 1) A method for manufacturing a light absorber, including:
a first step of irradiating a resin substrate with an ion beam;
a second step of etching the irradiated resin substrate with an alkaline solution to form an uneven surface on its surface;
a third step of forming a transfer body which covers the uneven surface of the etched resin substrate; and
a fourth step of peeling off the transfer body from the resin substrate to obtain a light absorber.

(Appendix 2) The method for manufacturing a light absorber according to appendix 1, wherein
the resin substrate is allyl diglycol carbonate resin (CR-39),
the ion beam includes either Ne ions or ions heavier than Ne ions, and
the alkaline solution is strongly alkaline.

(Appendix 3) The method for manufacturing a light absorber according to appendix 1 or 2, wherein the ion beam has an acceleration energy of 200 MeV or more.

(Appendix 4) The method for manufacturing a light absorber according to any one of appendices 1 to 3, wherein the transfer body is a metal film formed on the uneven surface of the etched resin substrate in the third step.

(Appendix 5) The method for manufacturing a light absorber according to appendix 4, wherein a surface with a total reflectance of 0.5% or less at wavelengths of 250 nm to 770 nm is formed on the light absorber of the metal film.

(Appendix 6) The method for manufacturing a light absorber according to appendix 5, wherein a surface with a total reflectance of 0.1% or more at wavelengths of 250 nm to 770 nm is formed on the light absorber of the metal film.

(Appendix 7) The method for manufacturing a light absorber according to any one of appendices 1 to 3, wherein the transfer body is a photocurable resin which is applied onto the uneven surface of the etched resin substrate and cured by light irradiation in the third step.

(Appendix 8) The method for manufacturing a light absorber according to appendix 7, wherein a surface with a total reflectance of 0.5% or less at wavelengths of 5 μm to 15 μm is formed on the light absorber of the photocurable resin.

(Appendix 9) The method for manufacturing a light absorber according to appendix 8, wherein a surface with a total reflectance of 0.2% or more at wavelengths of 5 μm to 15 μm is formed on the light absorber of the photocurable resin.

(Appendix 10) The method for manufacturing a light absorber according to appendix 7, wherein a surface with a total reflectance of 0.3% or less at wavelengths of 3 μm to 15 μm is formed on the light absorber of the photocurable resin.

(Appendix 11) The method for manufacturing a light absorber according to appendix 10, wherein a surface with a total reflectance of 0.02% or more at wavelengths of 3 μm to 15 μm is formed on the light absorber of the photocurable resin.

(Appendix 12) The method for manufacturing a light absorber according to any one of appendices 1 to 3, wherein the transfer body is a silicone rubber in which a silicone composition is applied onto the uneven surface of the etched resin substrate and cured in the third step.

(Appendix 13) The method for manufacturing a light absorber according to appendix 12, wherein a surface with a total reflectance of 0.5% or less at wavelengths of 5 μm to 15 μm is formed on the light absorber of the silicone rubber.

(Appendix 14) The method for manufacturing a light absorber according to appendix 13, wherein a surface with a total reflectance of 0.1% or more at wavelengths of 5 μm to 15 μm is formed on the light absorber of the silicone rubber.

(Appendix 15) The method for manufacturing a light absorber according to appendix 12, wherein a surface with a total reflectance of 0.2% or less at wavelengths of 5.5 μm to 15 μm is formed on the light absorber of the silicone rubber.

(Appendix 16) The method for manufacturing a light absorber according to appendix 15, wherein a surface with a total reflectance of 0.001% or more at wavelengths of 5.5 μm to 15 μm is formed on the light absorber of the silicone rubber.

(Appendix 17) The method for manufacturing a light absorber according to any one of appendices 1 to 16, further including:
a fifth step of forming a re-transfer body which covers the uneven surface of the transfer body obtained in the fourth step; and
a sixth step of peeling off the re-transfer body from the transfer body to obtain a light absorber.

(Appendix 18) The method for manufacturing a light absorber according to appendix 17, wherein the re-transfer body is a silicone rubber prepared by applying and curing a silicone composition with carbon powder dispersed.

(Appendix 19) The method for manufacturing a light absorber according to appendix 18, wherein a surface with a total reflectance of 0.6% or less at wavelengths of 0.25 μm to 2.4 μm is formed on the light absorber of the silicone rubber with the carbon powder dispersed.

(Appendix 20) The method for manufacturing a light absorber according to appendix 19, wherein a surface with a total reflectance of 0.2% or more at wavelengths of 0.25 μm to 2.4 μm is formed on the light absorber of the silicone rubber with the carbon powder dispersed.

(Appendix 21) The method for manufacturing a light absorber according to appendix 18, wherein a surface with a total reflectance of 0.4% or less at wavelengths of 2 μm to 15 μm is formed on the light absorber of the silicone rubber with the carbon powder dispersed.

(Appendix 22) The method for manufacturing a light absorber according to appendix 21, wherein a surface with a total reflectance of 0.001% or more at wavelengths of 2 μm to 15 μm is formed on the light absorber of the silicone rubber with the carbon powder dispersed.

(Appendix 23) A method for manufacturing a light absorber, including:
a first step of irradiating a resin substrate with an ion beam; and
a second step of etching a surface of the irradiated resin substrate with an alkaline solution,
wherein an uneven surface with a total reflectance of 0.4% or less at wavelengths of 5 μm to 15 μm is formed on the resin substrate by the first and second steps.

(Appendix 24) The method for manufacturing a light absorber according to appendix 23, wherein the resin substrate has a total reflectance of 0.2% or more at wavelengths of 5 μm to 15 μm.

(Appendix 25) A method for manufacturing a light absorber, including:
a first step of irradiating a resin substrate with an ion beam; and
a second step of etching a surface of the irradiated resin substrate with an alkaline solution,
wherein an uneven surface with a total reflectance of 0.1% or less at wavelengths of 4 μm to 15 μm is formed on the resin substrate by the first and second steps.

(Appendix 26) The method for manufacturing a light absorber according to appendix 25, wherein the resin substrate has a total reflectance of 0.001% or more at wavelengths of 4 μm to 15 μm.

(Appendix 27) The method for manufacturing a light absorber according to any one of appendices 23 to 26, wherein the resin substrate is an allyl diglycol carbonate resin (CR-39),
the alkaline solution is strongly alkaline, and
the ion beam includes either Ne ions or ions heavier than Ne ions.

(Appendix 28) The method for manufacturing a light absorber according to any one of appendices 23 to 27, wherein the ion beam has an acceleration energy of 200 MeV or more.

The invention claimed is:

1. A method for manufacturing a light absorber, comprising:
a first step of irradiating a resin substrate with an ion beam;
a second step of etching the irradiated resin substrate with an alkaline solution to form an uneven surface on its surface, wherein the uneven surface formed by the first and second steps has a total reflectance of 0.1% or less at wavelengths of 4 μm to 15 μm;
a third step of forming a transfer body which covers the uneven surface of the etched resin substrate; and
a fourth step of peeling off the transfer body from the resin substrate to obtain a light absorber,
wherein the ion beam has an acceleration energy of 200 MeV or more and 260 MeV or less and wherein the ion beam includes either Ne ions or ions heavier than Ne ions.

2. The method for manufacturing a light absorber according to claim 1, wherein
the resin substrate is allyl diglycol carbonate resin (CR-39), and
the alkaline solution is a sodium hydroxide solution or a potassium hydroxide solution.

3. The method for manufacturing a light absorber according to claim 2, wherein the transfer body is a metal film formed on the uneven surface of the etched resin substrate in the third step.

4. The method for manufacturing a light absorber according to claim 3, wherein a surface with a total reflectance of 0.5% or less at wavelengths of 250 nm to 770 nm is formed on the light absorber of the metal film.

5. The method for manufacturing a light absorber according to claim 2, wherein the transfer body is a photocurable resin which is applied onto the uneven surface of the etched resin substrate and cured by light irradiation in the third step.

6. The method for manufacturing a light absorber according to claim 5, wherein a surface with a total reflectance of 0.3% or less at wavelengths of 3 μm to 15 μm is formed on the light absorber of the photocurable resin.

7. The method for manufacturing a light absorber according to claim 2, wherein the transfer body is a silicone rubber prepared by mixing a main agent and a curing agent of a two-component curable silicone composition, dropping and applying onto the uneven surface of the etched resin substrate and curing the composition in the third step.

8. The method for manufacturing a light absorber according to claim 7, wherein a surface with a total reflectance of 0.2% or less at wavelengths of 5.5 μm to 15 μm is formed on the light absorber of the silicone rubber.

9. The method for manufacturing a light absorber according to claim 2, further comprising:
   a fifth step of forming a re-transfer body which covers the uneven surface of the transfer body obtained in the fourth step; and
   a sixth step of peeling off the re-transfer body from the transfer body to obtain a light absorber.

10. The method for manufacturing a light absorber according to claim 9, wherein the re-transfer body is a silicone rubber prepared by applying and curing a silicone composition with carbon powder dispersed in the fifth step,
   a surface with a total reflectance of 0.6% or less at wavelengths of 0.25 μm to 2.4 μm and a total reflectance of 0.4% or less at wavelengths of 2 μm to 15 μm is formed on the light absorber of the silicone rubber with the carbon powder dispersed.

11. The method for manufacturing a light absorber according to claim 9, wherein the transfer body is a silicone rubber prepared by applying a silicone composition onto the uneven surface of the etched resin substrate and curing the composition in the third step.

12. The method for manufacturing a light absorber according to claim 1, wherein the transfer body is a metal film formed on the uneven surface of the etched resin substrate in the third step.

13. The method for manufacturing a light absorber according to claim 12, wherein a surface with a total reflectance of 0.5% or less at wavelengths of 250 nm to 770 nm is formed on the light absorber of the metal film.

14. The method for manufacturing a light absorber according to claim 1, wherein the transfer body is a photocurable resin which is applied onto the uneven surface of the etched resin substrate and cured by light irradiation in the third step.

15. The method for manufacturing a light absorber according to claim 14, wherein a surface with a total reflectance of 0.3% or less at wavelengths of 3 μm to 15 μm is formed on the light absorber of the photocurable resin.

16. The method for manufacturing a light absorber according to claim 1, wherein the transfer body is a silicone rubber prepared by applying a silicone composition onto the uneven surface of the etched resin substrate and curing the composition in the third step.

17. The method for manufacturing a light absorber according to claim 16, wherein a surface with a total reflectance of 0.2% or less at wavelengths of 5.5 μm to 15 μm is formed on the light absorber of the silicone rubber.

18. The method for manufacturing a light absorber according to claim 1, further comprising:
   a fifth step of forming a re-transfer body which covers the uneven surface of the transfer body obtained in the fourth step; and
   a sixth step of peeling off the re-transfer body from the transfer body to obtain a light absorber.

19. The method for manufacturing a light absorber according to claim 18, wherein the transfer body is a silicone rubber prepared by applying a silicone composition onto the uneven surface of the etched resin substrate and curing the composition in the third step.

20. The method for manufacturing a light absorber according to claim 18, wherein the re-transfer body is a silicone rubber prepared by applying and curing a silicone composition with carbon powder dispersed in the fifth step,
   a surface with a total reflectance of 0.6% or less at wavelengths of 0.25 μm to 2.4 μm and a total reflectance of 0.4% or less at wavelengths of 2 μm to 15 μm is formed on the light absorber of the silicone rubber with the carbon powder dispersed.

\* \* \* \* \*